Patented July 7, 1953

2,644,757

UNITED STATES PATENT OFFICE 2,644,757

FISH CANNING PROCESS AND PACK

Hercules D. Dakis, San Diego, Calif.

No Drawing. Application July 17, 1950,
Serial No. 174,353

6 Claims. (Cl. 99—188)

This invention relates to the packing of fish and more particularly to the packing of tuna.

It is one object of this invention to dispense, in the packing of fish and particularly in the packing of tuna, with the necessity of providing an edible oil in the fish pack.

It is another object of this invention to provide a water pack for tuna in which a vegetable substance is introduced to preserve the fish and condition the natural oils in the fish.

It is a further object of this invention to provide a water pack for tuna fish which is more economical than conventional methods.

These and other objects and advantages of the present invention will be apparent from the annexed specification.

In carrying out the present invention the fish, or preferably tuna fish, is prepared in the conventional manner for packing and when ready to be inserted in the cans it is first mixed with water which has been prepared at the rate of 1 gallon of water to 1 tablespoon full of a vegetable drug known as chamomile (*Matricaria chamomilla*), a suitable amount of salt and, for flavoring approximately 1 drop of concentrated lemon oil. While the amount of water to be thus prepared per pounds of fish packed is not critical, 1 gallon may, if desired, be used in canning 2 cases of 1 pound tins of tuna, i. e. 24 pounds of tuna.

The chamomile has been found empirically to preserve the fish and to condition the natural oils in the fish and thus permit the elimination of any such oil, such as olive, cottonseed oil, or the like.

While there has been described what at present is considered a preferred embodiment of the invention, it will be obvious to those skilled in the art that various modifications and changes can be made therein and that the present invention resides essentially in the elimination or reduction of oil and the addition of the vegetable drug, chamomile.

What is claimed is:

1. A process of canning fish, comprising: mixing with the fish, prior to canning, water to which has been added the vegetable drug *Matricaria chamomilla*.

2. A process of canning fish, comprising: mixing with the fish, prior to canning, water and a small amount of *Matricaria chamomilla* in the absence of vegetable oils.

3. A process of canning fish, comprising: mixing with the fish, prior to canning, water, a small amount of *Matricaria chamomilla*, and a smaller amount of lemon oil.

4. A process of canning fish, comprising: mixing with the fish, prior to canning, water, salt, a small amount of *Matricaria chamomilla*, and a smaller amount of lemon oil.

5. A process of canning fish, comprising: mixing with the fish, prior to canning, water, *Matricaria chamomilla* and lemon oil in the proportions of 1 gal. of water to 1 tablespoon of *Matricaria chamomilla* to 1 drop of lemon oil for each approximately 24 lbs. of fish.

6. A tuna pack, comprising: a container filled with cooked tuna to which has been added water, *Matricaria chamomilla* and lemon oil in the proportions of 1 gal. of water, 1 tablespoon of *Matricaria chamomilla* and 1 drop of lemon oil to each approximately 24 lbs. of fish.

HERCULES D. DAKIS.

References Cited in the file of this patent

UNITED STATES PATENTS

| Number | Name | Date |
| --- | --- | --- |
| 2,088,831 | Ash | Aug. 3, 1937 |
| 2,373,988 | Wuori | Apr. 17, 1945 |

OTHER REFERENCES

"The Condensed Chemical Dictionary," third edition, 1942, published by Reinhold Publishing Corporation, 330 West Forty-second Street, New York, page 179.